United States Patent
Maksyutov et al.

(10) Patent No.: US 10,635,567 B2
(45) Date of Patent: Apr. 28, 2020

(54) SAMPLING ACROSS TRUSTED AND UNTRUSTED DISTRIBUTED COMPONENTS

(71) Applicant: Microsoft Technology Licensing, LLC, Redmond, WA (US)

(72) Inventors: Zaki Maksyutov, Redmond, WA (US); Dmitry G. Matveev, Kirkland, WA (US); Sergey Kanzhelev, Redmond, WA (US); David J. Lubash, Redmond, WA (US); Soubhagya Kumar Dash, Kirkland, WA (US); Arun Mathew Abraham, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 15/986,428

(22) Filed: May 22, 2018

(65) Prior Publication Data
US 2019/0361794 A1 Nov. 28, 2019

(51) Int. Cl.
*G06F 11/00* (2006.01)
*G06F 11/34* (2006.01)
(Continued)

(52) U.S. Cl.
CPC ........ *G06F 11/3466* (2013.01); *G06F 11/302* (2013.01); *G06F 21/6236* (2013.01);
(Continued)

(58) Field of Classification Search
CPC ............. G06F 11/3466; G06F 11/3476; G06F 11/3438; G06F 11/3409; G06F 11/3404; G06F 11/302; G06F 11/3006; G06F 21/6245; G06F 21/6254; G06F 21/6263; G06F 21/6236; H04W 12/001;
(Continued)

(56) References Cited

U.S. PATENT DOCUMENTS 6,083,281 A 7/2000 Diec et al.
9,021,262 B2 * 4/2015 Krajec ................ H04L 63/0428
713/167
(Continued)

OTHER PUBLICATIONS

"International Search Report and Written Opinion Issued in PCT Application No. PCT/US19/030984", dated Aug. 13, 2019, 17 Pages.

*Primary Examiner* — Marc Duncan
(74) *Attorney, Agent, or Firm* — Fiala & Weaver P.L.L.C.

(57) ABSTRACT

Techniques are described for sampling across trusted and untrusted distributed components. In accordance with embodiments, a first computing device receives a request from a second computing device, the first request including an operation identifier (ID) and a sampling ID that was generated by transforming a telemetry scope ID from a first value in a first domain to a second value in a second domain. The transformation may serve to anonymize and compress the telemetry scope ID. The first computing device determines whether or not to sample by comparing a ratio between the sampling ID and a size of the second domain with a sampling rate associated with the first computing device. The first computing device records telemetry about its processing of the first request in response to determining to sample and does not record any telemetry about its processing of the first request in response to determining not to sample.

20 Claims, 7 Drawing Sheets

(51) Int. Cl.
*G06F 11/30* (2006.01)
*H04L 29/06* (2006.01)
*G06F 21/62* (2013.01)
*H04W 12/02* (2009.01)

(52) U.S. Cl.
CPC ...... *G06F 21/6254* (2013.01); *H04L 63/0421* (2013.01); *H04W 12/02* (2013.01)

(58) Field of Classification Search
CPC ............ H04W 12/02; H04W 12/00514; H04L 63/04; H04L 63/0407; H04L 63/0421
See application file for complete search history.

(56) References Cited

U.S. PATENT DOCUMENTS

| | | | |
|---|---|---|---|
| 2003/0061550 A1 | 3/2003 | Ng et al. | |
| 2016/0092697 A1* | 3/2016 | Nayshtut | H04W 4/21 726/26 |
| 2016/0226731 A1 | 8/2016 | Maroulis | |
| 2018/0189164 A1* | 7/2018 | Kulkarni | G06F 11/3438 |
| 2018/0288135 A1* | 10/2018 | Narayan | G06F 11/3466 |
| 2018/0373885 A1* | 12/2018 | Arad | G06F 21/6254 |
| 2019/0066135 A1* | 2/2019 | Darg | G06F 16/951 |
| 2019/0073692 A1* | 3/2019 | Saravanan | G06Q 30/0255 |
| 2019/0340388 A1* | 11/2019 | Eidson | H04L 9/3213 |

\* cited by examiner

SAMPLING ACROSS TRUSTED AND UNTRUSTED DISTRIBUTED COMPONENTS

BACKGROUND

Application Performance Monitoring (APM) systems monitor the performance and availability of software applications. By detecting and diagnosing complex application performance problems, APM systems can maintain an expected level of service for users of the software applications. When a software application executes on a single component, all of the diagnostic data can be readily and easily accessed from the single component. However, many modern applications are implemented across multiple components, wherein such components may be remotely located from each other and even owned by different entities. For instance, a game executing on an end user computing device or server may make calls to different remote application programming interfaces (APIs) to obtain application information, player and co-player data, history, or the like. Diagnosing and debugging failures across multiple remote components using APM systems is difficult.

To address this issue, APM solutions leverage distributed tracing to obtain the diagnostic data. More specifically, distributed tracing allows the system to follow a user, session or operation across different (i.e., distributed) components and collect telemetry to obtain a holistic view across the application. For instance, an APM system may identify that erratic game play is due to slow performance of a partner API and is not due to core application logic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for sampling across distributed components. In accordance with embodiments, a first request is received by a first computing device from a second computing device, where the first request includes an operation identifier (ID) associated with an operation of an application and a sampling ID generated by transforming a telemetry scope ID from a first value in a first domain to a second value in a second domain. The first computing device extracts the operation ID and the sampling ID from the first request and determines whether or not to sample by comparing a ratio between the sampling ID and a size of the second domain with a sampling rate associated with the first computing device. The first computing device records telemetry about its processing of the first request in response to determining to sample and does not record any telemetry about its processing of the first request in response to determining not to sample.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As discussed in the Background section above, when a software application is implemented across distributed components, APM systems may leverage distributed tracing to collect telemetry to diagnose and debug failures. Distributed tracing allows an APM system to follow a user, session or operation across the different components to obtain a holistic view across the application. One way to tie together a trace across the different components is to use a correlation ID. All activities related to a logical operation or transaction have the same correlation ID which can be used to relate them together. For example, an operation ID may be used as the correlation ID.

Many APM systems also have a notion of a user associated with the operation. A user can have initiated one or more operations of the application across the various components. A user may be identified by a user ID. APM systems should ideally not propagate user IDs across the dependent components as some or all of them might be owned by other parties. Passing user IDs allows dependent components to track the application's users and possibly their progression through the application. Since a generic APM runtime likely cannot tell which component to trust or not, it is safer to simply not share the user ID. Therefore, the collection of user IDs is generally limited to just the front end or client portion of the application.

In contrast, an operation ID may exist on the client component as well as the dependent components. For this reason, as long as the relationship between the user ID and the operation ID is known, the operation ID can be used to tie telemetry in different components back to the originating user. In this way, it becomes possible to do things like view telemetry events across all components for a particular user. This approach only works, however, if none of the components implements sampling. Unfortunately, sampling of telemetry is common for modern applications.

As used herein, the term sampling refers to a component (a computing device or process executing thereon) collecting telemetry about only a portion of the operations that it handles. Sampling addresses the issue that storing telemetry events can be extremely expensive in terms of various computing resources, such as memory, processing cycles, and the like. By collecting telemetry about only a portion of the operations it handles, a component can reduce its consumption of such computing resources, thereby improving its performance and reducing the cost associated with maintaining it.

A difficulty presented by distributed sampling lies in ensuring that the same set of users or operations are "sampled in" (i.e., subject to telemetry collection) or "sampled out" (i.e., not subject to telemetry collection) consistently across the different components. For example, if an operation is sampled in for only two out of four components, then distributed tracing has broken down for that operation because of the gaps in telemetry.

One way to avoid this is to pass along the operation ID and to require all the components to sample based on the operation ID. In this way, there will be at least some fraction of operations for which telemetry is collected at full fidelity, corresponding to the lowest sampling rate across the components. Since the operation ID in many implementations is essentially a random number, it is safe to pass along. However, sampling by operation ID will mean that user-level information will be lossy. It will not be possible to fully perform tasks such as viewing all the telemetry events for a particular user. One solution to this problem is to pass the user ID across the components, but this means external and potentially untrusted components can track the users. Another approach is for the front end component to make the sampling decision for all the other components and pass along a 'Sampled in' flag that all components need to honor. This has the drawback of not allowing the components to control their sampling rates and is usually not acceptable for applications with cross-organization ownership of components, which is a common scenario these days.

Embodiments described herein address these and other issues related to sampling across distributed components. In particular, embodiments described herein enable distributed operation and user tracing with sampling in an untrusted environment, allow consistent user-based sampling across a distributed application, and prevent dependent components from being able to track the users of the distributed application. As will be discussed in more detail below, the foregoing features may be achieved in part by transforming user IDs (or other IDs associated with a desired telemetry scope, referred to herein as telemetry scope IDs), into a compressed and anonymized sampling ID that can then be attached to operations that are transmitted to other components and used by those components to make a sampling in/sampling out decision.

Embodiments described herein also provide a means to further obfuscate user information by merging together sampling IDs in a non-linear manner. This merging further prevents dependent components from being able to track users based on the sampling IDs, allows fine granularity at the low end of the sampling ID domain to support low sampling rates like 0.1%, supports coarser granularity at high sampling rates (100%, 50%, etc.) and has parameters to control both the minimum sampling rate supported as well as the number of sampling rates supported. Embodiments described herein further ensure consistent sampling across the distributed components, allow different sampling rates in the various components of the application, and prevent leaking of user data and statistics to the various components of the application. Since each component is permitted to apply its own sampling rate, each such component can thereby conserve its computing resources by limiting the amount of telemetry that is recorded. For example, each component can limit the amount of processor cycles and memory utilized for performing telemetry, thereby enabling those resources to be used to enable other applications and system programs running on those components to run better and more efficiently.

Figure 1:
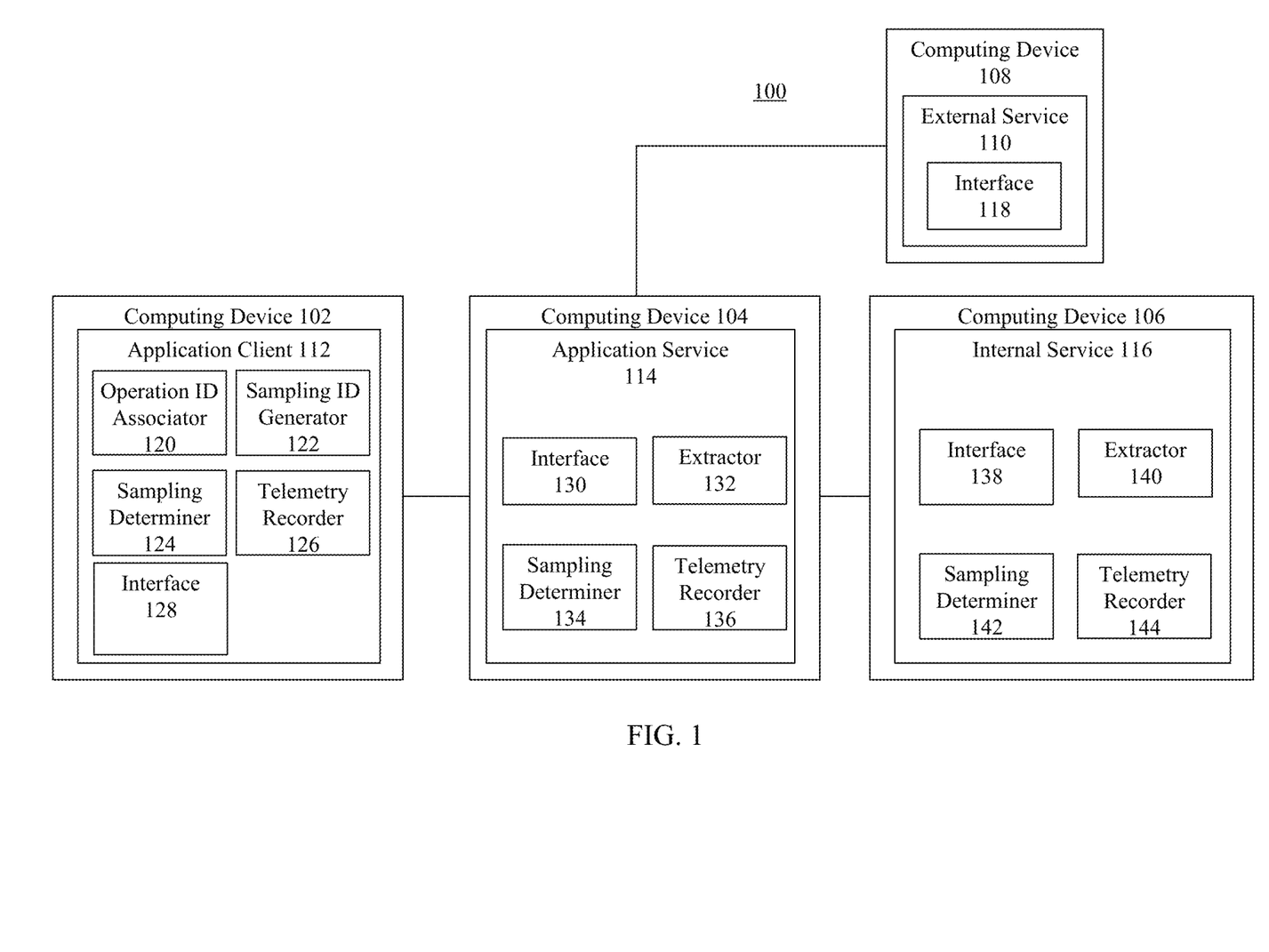
FIG. 1 is a block diagram of an example system for sampling across distributed components, according to an example embodiment.

To help illustrate the foregoing, FIG. 1 will now be described. In particular, FIG. 1 is a block diagram of a system 100 for sampling across distributed components, according to an example embodiment. As shown in FIG. 1, system 100 includes a computing device 102, a computing device 104, a computing device 106, and a computing device 108. Computing device 102 is connected to computing device 104 via a first network connection, computing device 104 is connected to computing device 106 via a second network connection, and computing device 104 is connected to computing device 108 via a third network connection. It is noted that although four computing devices are shown in system 100, any number of computing devices may exist in system 100. FIG. 1 is described as follows.

In one embodiment, computing device 102 is an end user device (e.g., smart phone, tablet computer, laptop computer, desktop computer, game console, smart television, or the like) that is executing an application client 112 (or application front end) and computing device 104 is a server that is executing an application service 114 (or application back-end), and these devices are connected via a network such as the Internet. In further accordance with this embodiment, computing device 106 may comprise a server that is internal to an organization that owns computing device 104 and runs an internal service 116 that may be invoked or called upon by application service 114. Computing device 104 may be connected to computing device 106 via a network that is internal to the organization or via some other means. In still further accordance with this embodiment, computing device 108 may comprise a server that is external to the organization that owns computing device 104 and runs an external service 110 that may be invoked or called upon by application service 114. Computing device 104 may be connected to computing device 108 via an external network connection, such as the Internet or some other network connection.

However, the foregoing examples are not intended to be limiting and computing devices 102, 104, 106 and 108 may each comprise any type of computing device and the network connections therebetween may be implemented by any type of network. The connections between the computing devices may also be peer-to-peer connections.

As shown in FIG. 1, an application client 112 runs on computing device 102 and includes an operation ID associator 120, a sampling ID generator 122, a sampling determiner 124, a telemetry recorder 126, and an interface 128. In the embodiment shown in FIG. 1, each of these components comprise part of application client 112. However, in alternate embodiments, one or more of these components may be separate from application client 112 and executed concurrently therewith by computing device 102.

In embodiments, an operation of an application that comprises application client 112 and application service 114 is initiated on computing device 102 by application client 112 or a user thereof. To enable distributed tracing of the operation, both an operation ID and a sampling ID may be associated with the operation. The sampling ID may be generated by anonymizing and compressing a telemetry scope ID. The telemetry scope ID may comprise, for example, a user ID, a device ID, a session ID, an account ID, or any other identifier that can be used to define the desired scope of the telemetry but that the application publisher may not wish to be disseminated to the distributed computing devices of system 100.

For example, and as shown in FIG. 1, operation ID associator 120 is configured to associate an operation ID with the initiated operation. Likewise, sampling ID generator 122 is configured to generate a sampling ID based on a telemetry scope ID, such as a user ID, device ID, session ID, or account ID, and associate it with the initiated operation. In particular, sampling ID generator 122 is configured to transform the telemetry scope ID from a first domain having a first range of values to a sampling ID in a second domain (a sampling domain) having a second range of values. The second range of values may be compressed with respect to the first range of values and used in making sampling in/out decisions across all computing devices in system 100. This transformation has the effect of both anonymizing the telemetry scope ID and also compressing it.

The transformation of the telemetry scope ID to the sampling ID may be carried out in a variety of ways. For instance, in an embodiment, the sampling ID may be generated using the following equation:

$$S_{id} = \frac{2^N \, hash(TS_{id})}{ulong \cdot \text{Max}} \qquad \text{(Equation 1)}$$

wherein $S_{id}$ is the sampling ID, $TS_{id}$ is the telemetry scope ID, hash($TS_{id}$) is a function that hashes the telemetry scope ID to an unsigned long integer, ulong.Max is a maximum value of a variable of type unsigned long integer (dividing by it brings the hashed $TS_{id}$ within the $\{0 \ldots 1 \text{ range}\}$, N is a sampling exponent that determines the minimum granularity of the sampling rate, and $2^N$ is the size of the second domain. As noted above, the value $S_{id}$ may be used in making sampling in/out decisions across various computing devices in system 100.

Alternatively, in another embodiment, the sampling ID may be generated using the following equation:

$$S_{id} = hash(TS_{id}) \bmod 2^N \qquad \text{(Equation 2)}$$

wherein $S_{id}$ is the sampling ID, $TS_{id}$ is the telemetry scope ID, hash($TS_{id}$) is a function that hashes the telemetry scope ID to an unsigned long integer, N is a sampling exponent, and $2^N$ is the size of the second domain.

By applying such a transformation, sampling ID generator 122 anonymizes the telemetry scope ID and projects it into the $\{0, (2^N-1)\}$ range. In this way, the sampling ID can be passed across the different components of the application without exposing the corresponding telemetry scope ID. Furthermore, the sampling ID can be used by such components to determine whether or not to sample in or sample out based on a sampling rate associated with the component.

For example, sampling determiner 124 may be configured to determine whether or not to sample at computing device 102. Sampling determiner 124 may make this determination in various ways. For instance, in an embodiment, sampler determiner 124 determines whether or not to sample by making the following comparison:

$$\frac{S_{id}}{2^N} = \begin{cases} < \text{Sampling Rate,} & \text{then Sampled in} \\ \geq \text{Sampling Rate,} & \text{then Sampled out} \end{cases} \qquad \text{(Equation 3)}$$

wherein $S_{id}$ is the sampling ID and N is the sampling exponent. Thus, if sampling determiner 124 determines that the sampling ID divided by the size of the sampling domain is less than the sampling rate associated with computing device 102, then it will make a sampling in decision.

However, if sampling determiner 124 determines that the sampling ID divided by the size of the sampling domain is greater than or equal to the sampling rate associated with computing device 102, then sampling determiner 124 will make a sampling out decision.

In embodiments, if it is determined that data should be sampled in, then telemetry for the operation is recorded at the component and stored locally (e.g., in a memory device included within or otherwise accessible to the component) for later collection and/or access by an APM system. For example, in an embodiment, telemetry recorder 126 is configured to record telemetry data for the operation associated with the operation ID in response to a determination by sampling determiner 124 to sample in. If sampling determiner 124 determines not to sample in (i.e., it determines to sample out), telemetry recorder 126 does not record any telemetry data for the operation associated with the operation ID.

In further accordance with the example shown in FIG. 1, whether telemetry is recorded by computing device 102 or not, interface 128 of application client 112 transmits a request to application service 114 executing on computing device 104 to perform a service to carry out the operation associated with the operation ID. The request includes both the operation ID and the sampling ID. The request may comprise, for example and without limitation, an API call.

As shown in FIG. 1, application service 114 runs on computing device 104 and includes an interface 130, an extractor 132, a sampling determiner 134, and a telemetry recorder 136. In the embodiment shown in FIG. 1, each of these components comprise part of application service 114. However, in alternate embodiments, one or more of these components may be separate from application service 114 and executed concurrently therewith by computing device 104.

Interface 130 of application service 114 is configured to receive the request transmitted by interface 128 of application client 112. Extractor 132 is configured to extract the operation ID and the sampling ID from the request. Sampling determiner 134 is configured to determine whether or not to sample at computing device 106. In embodiments, sampling determiner 134 uses the same technique described above with respect to sampling determiner 124 to determine if the operation associated with the operation ID should be sampled in or sampled out. However, it should be noted that sampling determiner 134 may use its own sampling rate when applying Equation 3, thereby enabling application service 114 to maintain its own sampling rate that is independent from the other components in system 100. It should be further noted that the sampling rate applied at computing device 106 need not be fixed and can be modified or updated over time to allow for relatively more or less sampling at computing device 106. The changes to sampling rate may be based on for example, feedback received, historical data, external data, a change in an amount or type of resources available to computing device 106, or the like.

If sampling determiner 134 determines that the operation should be sampled in, then telemetry is recorded for the operation at the component and stored locally (e.g., in a memory device included within or otherwise accessible to the component) for later collection and/or access by the APM system. For example, in an embodiment, telemetry recorder 136 is configured to record telemetry data for the operation associated with the operation ID in response to a determination by sampling determiner 134 to sample in. If sampling determiner 134 determines not to sample in (i.e., it determines to sample out), telemetry recorder 136 does not record any telemetry data for the operation associated with the operation ID.

In further accordance with the example shown in FIG. 1, whether telemetry is recorded by computing device 104 or not, interface 130 of application service 114 transmits a request to an internal service 116 executing on computing device 106 to perform a further service in carrying out the operation associated with the operation ID. The request includes both the operation ID and the sampling ID. The request may comprise, for example and without limitation, an API call.

As shown in FIG. 1, internal service 116 runs on computing device 106 and includes an interface 138, an extractor 140, a sampling determiner 142, and a telemetry recorder 144. In the embodiment shown in FIG. 1, each of these components comprise part of internal service 116. However, in alternate embodiments, one or more of these components may be separate from internal service 116 and executed concurrently therewith by computing device 106.

Interface 138 of internal service 116 is configured to receive the request transmitted by interface 130 of application service 114. Extractor 140 is configured to extract the operation ID and the sampling ID from the request. Sampling determiner 142 is configured to determine whether or not to sample at computing device 106. In embodiments, sampling determiner 142 uses the same technique described above with respect to sampling determiner 124 and sampling determiner 134 to determine if the operation associated with the operation ID should be sampled in or sampled out. However, it should be noted that sampling determiner 134 may use its own sampling rate when applying Equation 3, thereby enabling internal service 116 to maintain its own sampling rate that is independent from the other components in system 100.

If sampling determiner 142 determines that the operation should be sampled in, then telemetry is recorded for the operation at the component and stored locally (e.g., in a memory device included within or otherwise accessible to the component) for later collection and/or access by the APM system. For example, in an embodiment, telemetry recorder 144 is configured to record telemetry data for the operation associated with the operation ID in response to a determination by sampling determiner 142 to sample in. If sampling determiner 142 determines not to sample in (i.e., it determines to sample out), telemetry recorder 144 does not record any telemetry data for the operation associated with the operation ID.

In further accordance with the example shown in FIG. 1, interface 130 of application service 114 also transmits a request to an external service 110 executing on computing device 108 to perform another service in carrying out the operation associated with the operation ID. The request includes both the operation ID and the sampling ID. The request may comprise, for example and without limitation, an API call. External service 110 includes an interface 118 that receives the call.

As noted above, computing device 108 (and external service 110 executing thereon) may be external with respect to an organization that owns computing device 104 and thus may be deemed an untrusted component. This untrusted component can obtain both the operation ID and sampling ID included in the request received from application service 114. As noted above, an operation ID may be essentially a random number, it is safe to pass along the untrusted component since it reveals nothing about the users of the application. Furthermore, due to the transformation performed by sampling ID generator 122, which anonymized and compressed the underlying telemetry scope ID (e.g., user ID, device ID, session ID, or account ID), this external component also cannot use the sampling ID to track user counts or behaviors of the users of the application.

As may be seen from the foregoing, the sampling ID can be used to determine if an operation should be sampled in or sampled out at each components of system 100. As long as each component understands the size of the sampling domain to which telemetry scope ID has been transformed, it can determine whether to sample a given operation in or out based on the sampling ID associated with the operation and its own sampling rate. This approach ensures that some minimum set of full fidelity tracing is performed for operations within a given telemetry scope (e.g., user ID, device ID, session ID or account ID), wherein the component with the lowest sampling rate will determine the number of operations for which such full fidelity telemetry can be obtained.

Embodiments will now be described that help to further obscure user counts and other behaviors associated with an application for which telemetry is collected. These embodiments make use of the fact that the sampling rates tend to be coarse grained at higher rates (e.g., 50% or 25%), and finer grained at lower rates (e.g., 0.1%). This means that the granularity of larger sampling IDs can be coarse but those at the lower end need to be relatively finer.

These embodiments aggressively merge together a large set of sampling IDs. For instance, if the higher sampling rates are coarse grained and the lower sampling rates are fine grained, a large set of sampling IDs can be merged together at the higher end since it would have the least impact on sampling grains. Following this example, as the sampling ranges move to the lower end, progressively smaller sets are merged until there is a single entry set at the lowest value. However, this is not to be construed in a limiting sense and the sampling IDs may be merged into various ranges in various ways.

Figure 2:
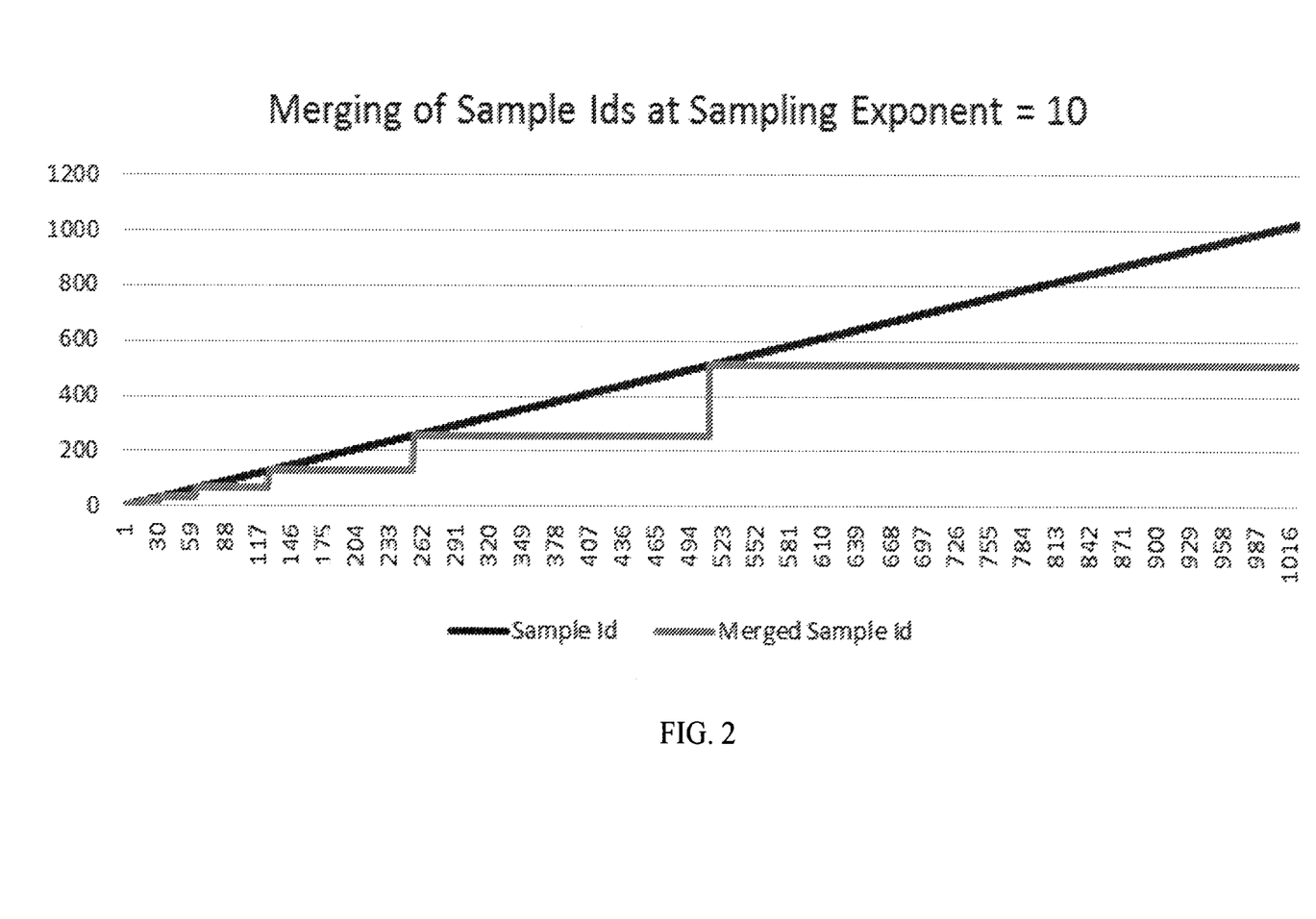
FIG. 2 is a chart that illustrates the merging of sampling IDs into merged sampling IDs, according to an example embodiment.

For instance, the sampling IDs may be merged by using the following:

$$\overline{S}_{id} = 2^{floor(log2Sid)} \quad \text{(Equation 4)}$$

where $\overline{S}_{id}$ is the merged sampling ID, $S_{id}$ is the raw sampling ID, floor(x) is a function that takes as input a real number x and returns the greatest integer that is less than or equal to x, and $log_2 x$ returns the binary logarithm of x. In accordance with this approach, each sampling ID is floored to the nearest power of 2. This merging will be further illustrated with reference to FIG. 2.

In particular, FIG. 2 is a chart 200 that illustrates the merging of sampling IDs into merged sampling IDs, according to an example embodiment. As shown in FIG. 2, for N=10, each sampling ID is floored to the nearest power of 2, and thus is merged to one of the following values: 2, 4, 8, 16, 32, 64, 128, 256 and 512. Thus, in further accordance with this example, sampling IDs in the range of 512 to 1023 will all be transformed to sampling ID 512. From a sampling standpoint, a sampling ID of 512 is enough to determine that at sampling rates of <50%, the operation is sampled out.

This merging approach provides many advantages. For instance, by merging the sampling IDs into buckets, another anonymity layer is added such that external components can not track users corresponding to the sampling IDs individually or in a fine grained statistical manner. Furthermore, by using the foregoing merging approach, finer grained sampling rates are supported. For instance, as shown in FIG. 2, at the lower end of chart 200, fewer IDs are compressed together which allows for fine grained sampling rates like ~0.1% to be supported. By following this approach, and as the N value increases, even finer grained sampling rates can be supported. For instance, when N=14, sampling rates such as ~0.006% are supported.

Figure 3:
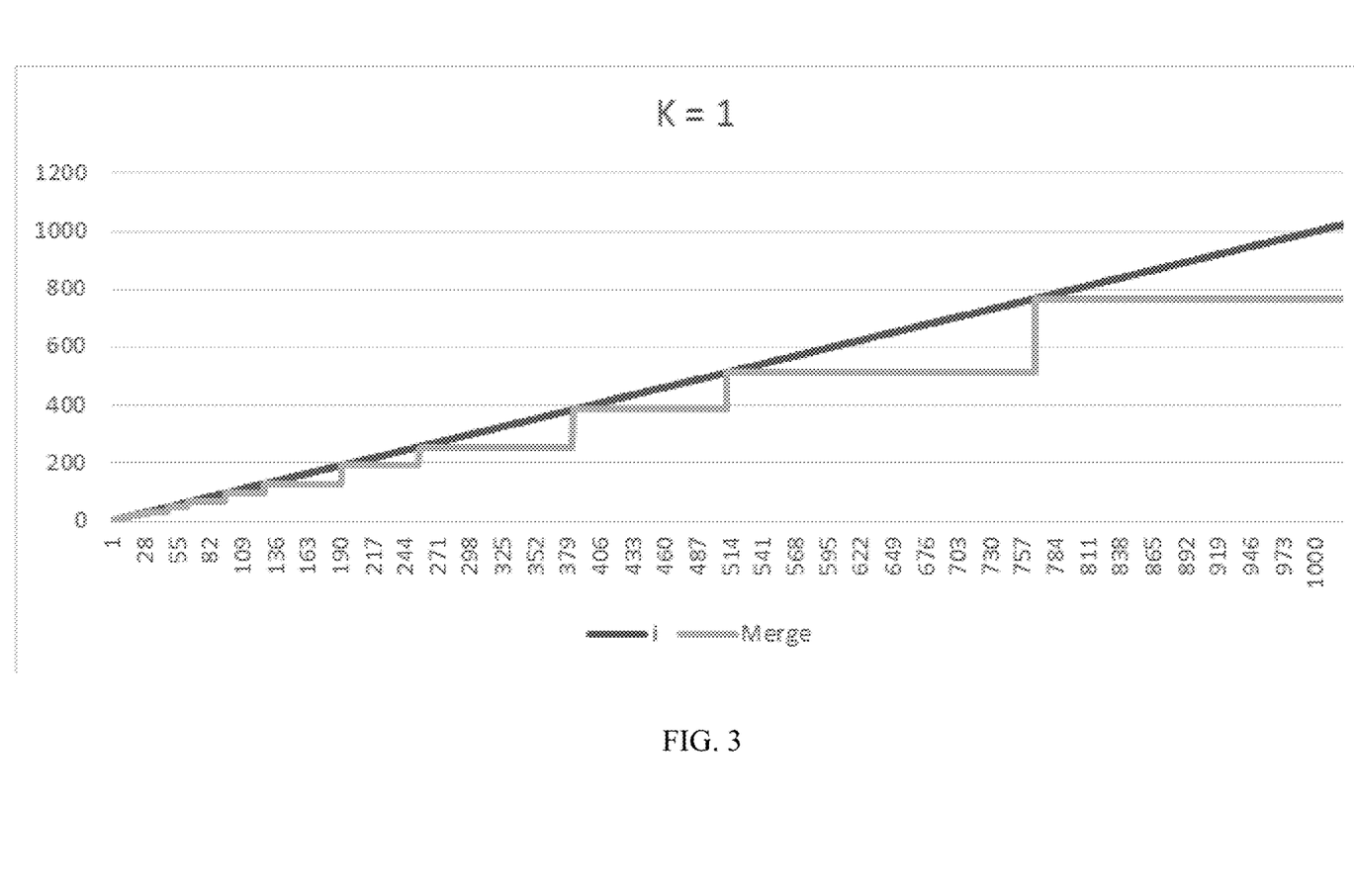
FIG. 3 is a chart that illustrates the merging of sampling IDs into merged sampling IDs using an algorithm that incorporates a split factor of 1, according to an example embodiment.
Figure 4:
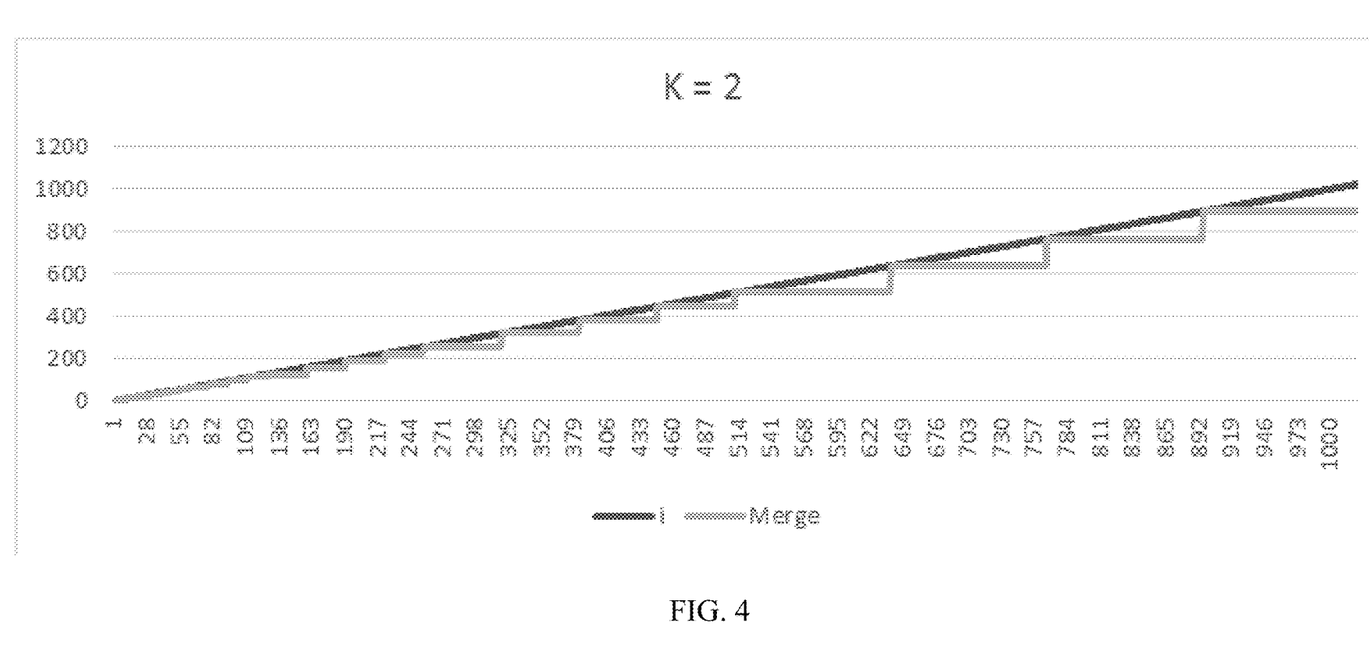
FIG. 4 is a chart that illustrates the merging of sampling IDs into merged sampling IDs using an algorithm that incorporates a split factor of 2, according to an example embodiment.

While the foregoing approach is simple to conceptualize and implement, it is locked to only some supported sampling rates—namely, 100%, 50%, 25%, 12.5% and so on. Another approach that allows a wider range of supported sampling rates to be achieved involves using the following:

$$\overline{S}_{id} = S_{id} \& !(2^{floor(log2Sid)-K} - 1) \quad \text{(Equation 5)}$$

where $\overline{S}_{id}$ is the merged sampling ID, $S_{id}$ is the raw sampling ID, floor(x) is a function that takes as input a real number x and returns the gratest integer that is less than or equal to x, $log_2 x$ returns the binary logarithm of x, ! is the binary NOT operator, & is the binary AND operator and K is a split factor. In accordance with this approach, each of the N original merge buckets or ranges is further split into $2^K$ merge buckets or ranges. This approach allows for more flexibility in the sampling rates that can be supported across a distributed application.

To help illustrate the foregoing, FIGS. 3 and 4 will now be described. In particular, FIG. 3 is a chart 300 that illustrates the merging of sampling IDs into merged sampling IDs using Equation 5 and incorporating a split factor K=1, according to an example embodiment. This approach supports sampling rates of 100%, 75%, 50%, 37.5%, 25% and so on.

FIG. 4 is a chart 400 that illustrates the merging of sampling IDs into merged sampling IDs using an algorithm that incorporates a split factor K=2, according to an example embodiment. This approach supports sampling rates of 100%, 87.5%, 75%, 62.5%, 50%, 43.75%, 37.5%, and so on. As can be seen, by increasing the value of the split factor K, the number of supported sampling rates can be increased.

Figure 5:
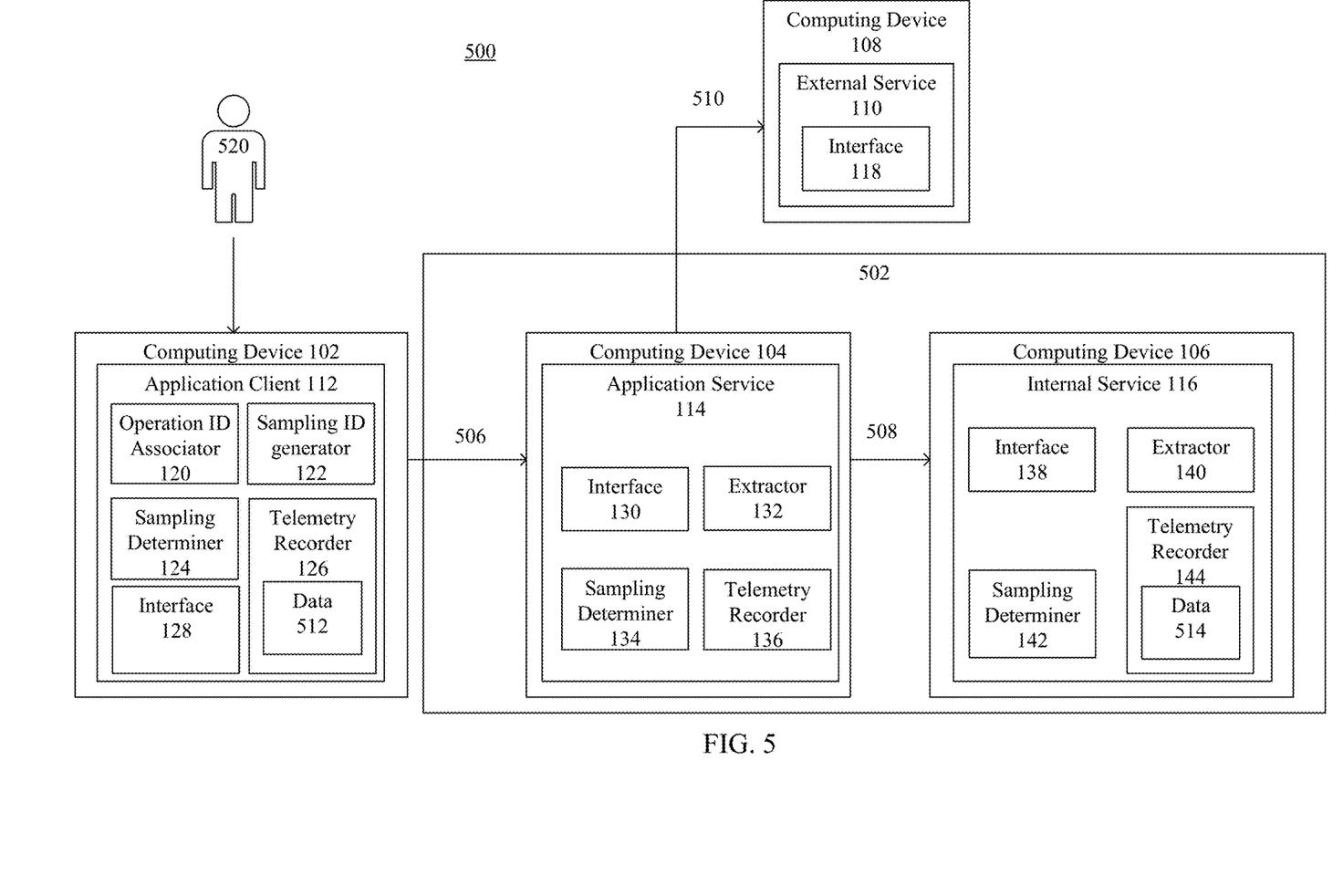
FIG. 5 is a block diagram of an example system for sampling across distributed components, according to an example embodiment.

A particular example of how an embodiment may operate in accordance with the foregoing techniques will now be described in reference to FIG. 5. In particular, FIG. 5 is a block diagram of an example system 500 for sampling across trusted and untrusted distributed components, according to an example embodiment. For the example of FIG. 5, it is to be assumed that K=0, N=10, the sampling rate associated with computing device 102 is 25%, the sampling rate associated with computing device 104 is 6.25% and the sampling rate associated with computing device 106 is 50%. As shown in FIG. 5, system 500 is similar to system 100 of FIG. 1 but further includes a user 520 of computing device 104, data 512, data 514, a request 506, a request 508, a request 510, and an organization 502.

In accordance with the example of FIG. 5, user 520 interacts with application client 112 on computing device 102 and thereby initiates an operation. Operation ID associator 120 associates an operation ID of 789 with the operation. Application client 112 further obtains a user ID associated with user 520 (e.g., by creating it, by obtaining it from the user, or in some other manner). Operating in accordance with Equation 2, sampling ID generator 122 applies a hashing function to the user ID to produce user ID hash 343212. In further accordance with Equation 2, sampling ID generator applies a modulo $2^{10}$ operation to the user ID hash (i.e., 343212% 1024) to produce a sampling ID of 172. Sampling ID generator 122 further applies Equation 5 to the sampling ID of 172 to produce a merged sampling ID of 128 (i.e., $2^{(log_2(172)-1)}$).

Sampling determiner 124 at computing device 102 then utilizes Equation 3 to make a sampling in/out decision for computing device 102. In accordance with Equation 3, sampling determiner 124 compares a ratio of the merged sampling ID to the size of the sampling domain (i.e., 128/1024=12.5%) to 25% which is the sampling rate associated with computing device 102. In this case, the ratio (12.5%) is less than the 25% sampling rate for computing device 102, and thus sampling determiner 124 determines that telemetry should be recorded for the operation with operation identifier 789. In accordance with this determination, telemetry recorder 126 records telemetry data 512 for the operation with operation identifier 789 and stores it. All such telemetry data may be annotated with the operation ID and the user ID for reference later.

In further accordance with this example, telemetry recorder 126 (or some other component of computing device 102) inserts the operation ID and merged sampling ID into request 506 that is transmitted from interface 128 of application client 112 to interface 130 of application service 114. For example and without limitation, the operation ID and the merged sampling ID may be incorporated into a header portion of request 506. At computing device 104, extractor 132 extracts the merged sampling ID and the operation ID from request 506 such that it can be used to determine if data should be sampled in or sampled out.

Sampling determiner 134 at computing device 104 then utilizes Equation 3 to make a sampling in/out decision for computing device 104. In accordance with Equation 3, sampling determiner 134 compares a ratio of the merged sampling ID to the size of the sampling domain (i.e., 128/1024) to 6.25% which is the sampling rate associated with computing device 104. In this case, the ratio (12.5%) is greater than the 6.25% sampling rate for computing device 104, and thus sampling determiner 134 determines that telemetry should not be recorded for the operation with operation identifier 789. In accordance with this determination, telemetry recorder 136 will not record any telemetry data for the operation with operation identifier 789.

In further accordance with this example, telemetry recorder 136 (or some other component of computing device 104) inserts the operation ID and merged sampling ID into request 508 that is transmitted from interface 130 of application service 114 to interface 138 of internal service 116. For example and without limitation, the operation ID and the merged sampling ID may be incorporated into a header portion of request 508. At computing device 106, extractor 140 then extracts the merged sampling ID and the operation ID from request 508 such that it can be used to determine if data should be sampled in or sampled out.

Sampling determiner 142 at computing device 106 then utilizes Equation 3 to make a sampling in/out decision for computing device 106. In accordance with Equation 3, sampling determiner 142 compares a ratio of the merged sampling ID to the size of the sampling domain (i.e., 128/1024) to 50% which is the sampling rate associated with computing device 106. In this case, the ratio (12.5%) is less than the 50% sampling rate for computing device 106, and thus sampling determiner 134 determines that telemetry should be recorded for the operation with operation identifier 789. In accordance with this determination, telemetry recorder 136 records telemetry data 514 for the operation with operation identifier 789 and stores it. All such telemetry data may be annotated with the operation ID.

In further accordance with this example, telemetry recorder 136 (or some other component of computing device 104) also inserts the operation ID and merged sampling ID into request 510 that is transmitted from interface 130 of application service 114 to interface 118 of external service 110, which is outside the boundaries of organization 502. For example and without limitation, the operation ID and the merged sampling ID may be incorporated into a header portion of request 508. At computing device 108, the merged sampling ID and the operation ID can be extracted from request 510. However, this information cannot used to track user 520 of application client 112. As such, the privacy of user 520 is protected since merged sampling ID 128 is used to identify user 520.

By following the above-described approach, tracing a distributed operation across different components, telemetry can be joined from all components based on the operation ID. Furthermore, to trace a user across the different components, application client 112 can obtain all operations performed by the user and then the telemetry from all the components can be jointed based on the corresponding operation IDs. In other words, by using the above-described approach, full fidelity user information should exist as long as the merged sampling ID of the user is accepted by the component with the lowest sampling rate.

Figure 6:
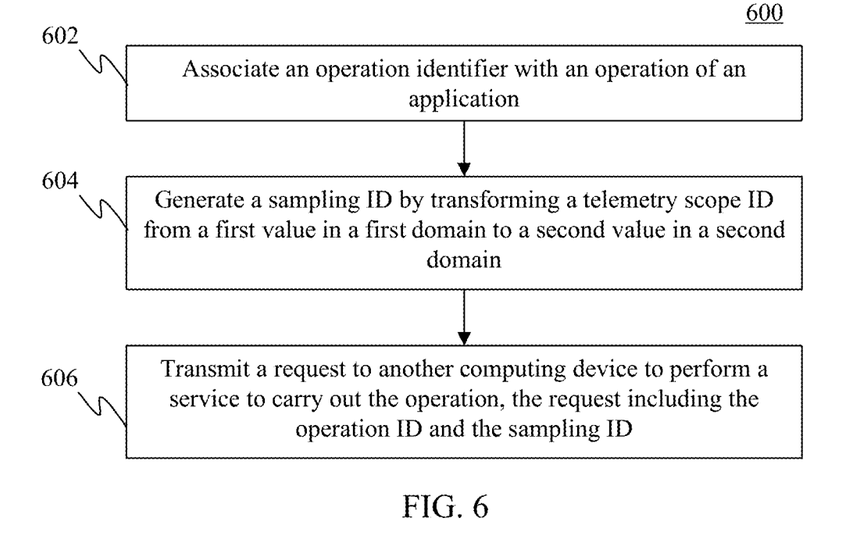
FIG. 6 depicts a flowchart of a method performed by a computing device for generating and attaching an operation ID and a sampling ID to a request and sending it to another computing device, in accordance with an example embodiment.

FIG. 6 depicts a flowchart 600 of a method performed by a computing device for generating and attaching an operation ID and a sampling ID to a request and sending it to another computing device in accordance with the foregoing techniques. The method of flowchart 600 may be performed, for example, by computing device 102 as described above in reference to FIG. 1 and FIG. 5. However, the method is not limited to that embodiment and persons skilled in the art will understand the method of flowchart 700 could be implemented by other computing devices (e.g., computing devices 104 or 106) as well as by other systems or components.

As shown in FIG. 6, the method of flowchart 600 begins at step 602 in which an operation identifier is associated with an operation of an application. For example, and with continued reference to FIG. 5, operation ID associator 120 associates operation identifier 789 with the operation initiated by user 520 of computing device 102.

At step 604, a sampling ID is generated by transforming a telemetry scope ID from a first value in a first domain to a second value in a second domain. For example, and with continued reference to FIG. 5, sampling ID generator 122 generates merged sampling ID 128 by transforming a telemetry scope ID (in this case a user ID) from a first domain to a value (i.e., 172) in a second domain (the sampling domain).

At step 606, a request is transmitted to another computing device to perform a service to carry out the operation, the request including the operation ID and the sampling ID. For example, and with continued reference to FIG. 5, request 506 is transmitted to computing device 104 to perform a service to carry out the operation associated with operation ID 789, wherein the request includes operation ID 789 and sampling ID 128.

Figure 7:
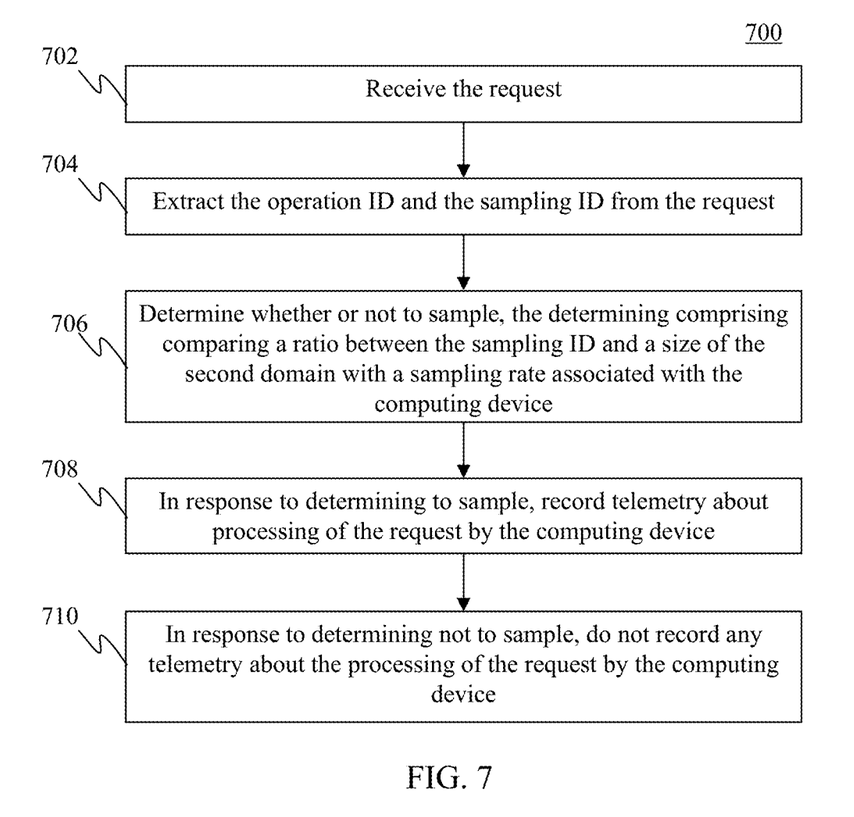
FIG. 7 depicts a flowchart of a method performed by a computing device for receiving a request from another computing device and making a sampling decision based on a sampling ID included in the request, in accordance with an example embodiment.

FIG. 7 depicts a flowchart 700 of a method performed by a computing device for receiving a request from another computing device and making a sampling decision based on a sampling ID included in the request, in accordance with an example embodiment. The method of flowchart 700 may be performed, for example, by computing device 104 as described above in reference to FIG. 1 and FIG. 5. However, the method is not limited to that embodiment and persons skilled in the art will understand the method of flowchart 700 could be implemented by other systems or components.

As shown in FIG. 7, the method of flowchart 700 begins at step 702 in which the request is received. For example, and with continued reference to FIG. 5, computing device 104 receives request 506 via interface 130.

At step 704, the operation ID and the sampling ID are extracted from the request. For example, and with continued reference to FIG. 5, extractor 132 extracts operation ID 789 and sampling ID 128 from request 506.

At step 706, it is determined whether or not to sample by comparing a ratio between the sampling ID and a size of the second domain with a sampling rate associated with the computing device. For example, and with continued reference to FIG. 5, sampling determiner 134 determines whether or not to sample by comparing a ratio between sampling ID 128 and a size of the second domain 1024 with a sampling rate of 6.25% associated with computing device 104.

At step 708, in response to a determination to sample (i.e., a sample in determination), telemetry about the processing of the request by the computing device is recorded. For example, and with continued reference to FIG. 5, if sampling determiner 134 determines to sample, sample telemetry recorder 136 records telemetry about processing of request 506 by computing device 104.

At step 710, in response to a determination not to sample (i.e., a sample out determination), no telemetry is recorded about the processing of the request by the computing device. For example, and with continued reference to FIG. 5, if sampling determiner 134 determines not to sample, then telemetry recorder 136 will not record any telemetry about the processing of request 506 by computing device 104.

III. Example Mobile and Stationary Device Embodiments

The aforementioned systems (e.g., the systems shown in FIGS. 1 and 5) and methods (e.g., the methods shown in FIGS. 6 and 7) may be implemented in hardware, or hardware combined with software and/or firmware. For example, computing device 102, computing device 104, computing device 106, computing device 108, or any of the components thereof, and the methods of the flowcharts shown in FIGS. 6 and 7 may each be implemented as computer program code/instructions configured to be executed in one or more processors and stored in a computer readable storage medium. Alternatively, these components of systems 100 and 500 and methods may be implemented as hardware logic/electrical circuitry.

Figure 8:
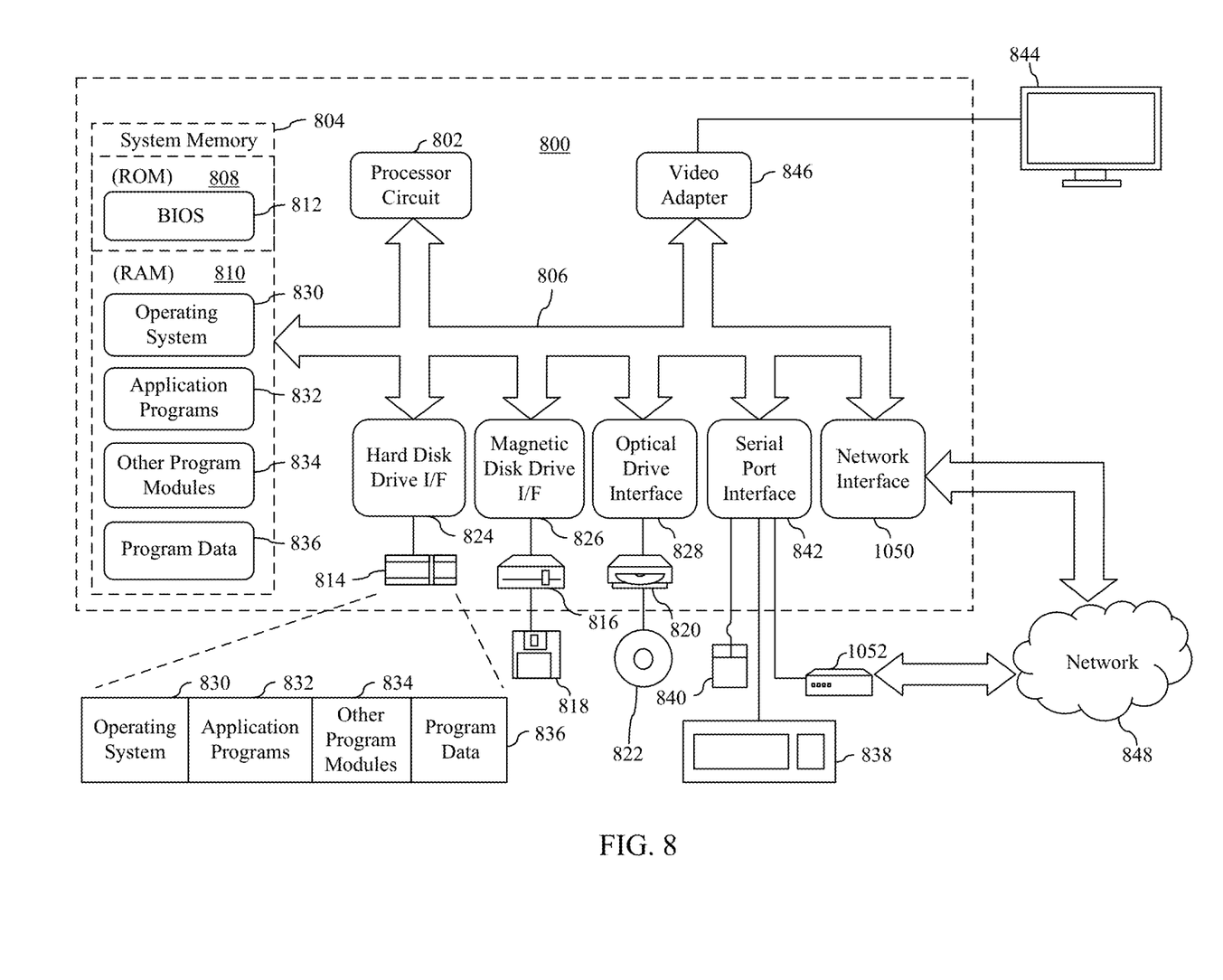
FIG. 8 shows a block diagram of an example computing device that may be used to implement various embodiments.

FIG. 8 depicts a block diagram of an example computing device 800 that may be used to implement various embodiments. For example, one or more of computing device 102, computing device 104, computing device 106, computing device 108, or any component thereof may be implemented in one or more computing devices similar to computing device 800 in stationary or mobile computer embodiments, including one or more features of computing device 102, computing device 104, computing device 106, computing device 108, or any component thereof and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media. A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the systems described in reference to FIGS. 1 and 5, and the methods described in reference to FIGS. 6 and 7.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media (including memory 820 of FIG. 8). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A system includes a first computing device The first computing device is configured to: associate an operation identifier (ID) with an operation of an application; generate a sampling ID, generating the sampling ID comprising transforming a telemetry scope ID from a first value in a first domain to a second value in a second domain; determine whether or not to sample, the determining comprising at least comparing a ratio between the sampling ID and a size of the second domain with a sampling rate associated with the first computing device; in response to determining to sample, record telemetry about processing of the operation by the first computing device; and in response to determining not to sample, not record any telemetry about the processing of the operation by the first computing device.

In one embodiment of the foregoing system, the telemetry scope ID comprises one of: a user ID; a device ID; a session ID; or an account ID.

In another embodiment of the foregoing system, the first computing device is further configured to transmit a first request to a second computing device to perform a first service to carry out the operation, the first request including the operation ID and the sampling ID. In further accordance with this embodiment, the system further comprises the second computing device. The second computing device is configured to receive the first request; extract the operation ID and the sampling ID from the first request; determine whether or not to sample, the determining comprising at least comparing a ratio between the sampling ID and a size of the second domain with a sampling rate associated with the second computing device; in response to determining to sample, record telemetry about processing of the first request by the second computing device; and in response to determining not to sample, not record any telemetry about the processing of the first request by the second computing device.

In further accordance with such an embodiment, the second computing device may be further configured to: transmit a second request to a third computing device to perform a second service to carry out the operation, the second request including the operation ID and the sampling ID. The second computing device and the third computing device may be internal to an organization. Alternatively, the second computing device may be internal to an organization and the third computing device may be external to the organization.

In a still further embodiment of the foregoing system, the sampling rate associated with the second computing device is different than the sampling rate associated with the first computing device.

In another embodiment of the foregoing system, the second domain is compressed with respect to the first domain.

In yet another embodiment of the foregoing system, transforming the telemetry scope ID from the first value in the first domain to the second value in the second domain comprises calculating:

$$S_{id} = \frac{2^N \, hash(TS_{id})}{ulong \cdot \text{Max}}$$

wherein $S_{id}$ is the sampling ID, $TS_{id}$ is the telemetry scope ID, $hash(TS_{id})$ is a function that hashes the telemetry scope ID to an unsigned long integer, ulong.Max is a maximum value of a variable of type unsigned long integer, N is a sampling exponent, and $2^N$ is the size of the second domain.

In still another embodiment of the foregoing system, transforming the telemetry scope ID from the first value in the first domain to the second value in the second domain comprises calculating:

$$S_{id} = hash(TS_{id}) \bmod 2^N$$

wherein $S_{id}$ is the sampling ID, $TS_{id}$ is the telemetry scope ID, $hash(TS_{id})$ is a function that hashes the telemetry scope ID to an unsigned long integer, N is a sampling exponent, and $2^N$ is the size of the second domain.

In a further embodiment of the foregoing system, generating the sampling ID further comprises performing a merging operation on the second value, the merging operation returning a merged value for each value range in a plurality of value ranges of the second value.

In a still further embodiment of the foregoing system, the size of each value range in the plurality of value ranges of the second value increases as the second value increases.

In another embodiment of the foregoing system, performing the merging operation on the second value comprises calculating:

$$\overline{S}_{id} = 2^{floor(log2Sid)}$$

wherein $\overline{S}_{id}$ is the sampling ID, $S_{id}$ is the second value, floor(x) is a function that takes as input a real number x and returns the greatest integer that is less than or equal to x, and $log_2$ x returns the binary logarithm of x.

In yet another embodiment of the foregoing system, performing the merging operation on the second value comprises calculating:

$$\overline{S}_{id} = S_{id}!(2^{floor(log2Sid)-K}-1)$$

wherein $\overline{S}_{id}$ is the sampling ID, $S_{id}$ is the second value, floor(x) is a function that takes as input a real number x and returns the greatest integer that is less than or equal to x, $log_2$ x returns a binary logarithm of x, ! is a binary NOT operator, & is the a binary AND operator, and K is a split factor where each of the N original is further split into $2^K$ merge ranges.

A first computing device is also described herein. The first computing device comprises one or more processor circuits; and one or more memory devices communicatively connected to the one or more processor circuits, the one or more memory devices storing program logic for execution by the one or more processor circuits, the program logic comprising: a receiver that is configured to receive a first request from a second computing device, the first request including an operation identifier (ID) associated with an operation of an application and a sampling ID generated by transforming a telemetry scope ID from a first value in a first domain to a second value in a second domain; an extractor that is configured to extract the operation ID and the sampling ID from the first request; a sampling determiner that is configured to determine whether or not to sample by at least comparing a ratio between the sampling ID and a size of the second domain with a sampling rate associated with the first computing device; and a telemetry recorder that is configured to record telemetry about processing of the first request by the first computing device in response to the sampling determiner determining to sample, and to not record any telemetry about the processing of the first request by the first computing device in response to the sampling determiner determining not to sample.

In another embodiment of the first computing device, the telemetry scope ID comprises one of: a user ID; a device ID; a session ID; or an account ID.

In yet another embodiment of the first computing device, the program logic further comprises a transmitter configured to: transmit a second request to a third computing device to perform a second service to carry out the operation, the second request including the operation ID and the sampling ID.

In still another embodiment of the first computing device, the first computing device and the third computing device are internal to an organization.

In a further embodiment of the first computing device, the first computing device is internal to an organization and the third computing device is external to the organization.

In a still further embodiment of the first computing device, the second domain is compressed with respect to the first domain.

In another embodiment of the first computing device, the telemetry scope ID was transformed from the first value in the first domain to the second value in the second domain comprises calculating:

$$S_{id} = \frac{2^N hash(TS_{id})}{ulong \cdot Max}$$

wherein $S_{id}$ is the sampling ID, $TS_{id}$ is the telemetry scope ID, hash($TS_{id}$) is a function that hashes the telemetry scope ID to an unsigned long integer, ulong.Max is a maximum value of a variable of type unsigned long integer, N is a sampling exponent, and $2^N$ is the size of the second domain.

In yet another embodiment of the first computing device, the telemetry scope ID was transformed from the first value in the first domain to the second value in the second domain by calculating:

$$S_{id} = hash(TS_{id}) mod\ 2^N$$

wherein $S_{id}$ is the sampling ID, $TS_{id}$ is the telemetry scope ID, hash($U_{id}$) is a function that hashes the telemetry scope ID to an unsigned long integer, N is a sampling exponent, and $2^N$ is the size of the second domain.

In still another embodiment of the first computing device, the sampling ID was generated by further performing a merging operation on the second value, the merging operation returning a merged value for each value range in a plurality of value ranges of the second value.

In a further embodiment of the first computing device, the size of each value range in the plurality of value ranges of the second value increases as the second value increases.

In a still further embodiment of the first computing device, performing the merging operation on the second value comprises calculating:

$$\overline{S}_{id} = 2^{floor(log2Sid)}$$

wherein $\overline{S}_{id}$ is the sampling ID, $S_{id}$ is the second value, floor(x) is a function that takes as input a real number x and returns the greatest integer that is less than or equal to x, and $log_2$ x returns the binary logarithm of x.

In another embodiment of the first computing device, performing the merging operation on the second value comprises calculating:

$$\overline{S}_{id} = S_{id}\&!(2^{floor(log2Sid)-K}-1)$$

wherein $\overline{S}_{id}$ is the sampling ID, $S_{id}$ is the second value, floor(x) is a function that takes as input a real number x and returns the greatest integer that is less than or equal to x, $log_2$ x returns a binary logarithm of x, ! is a binary NOT operator, & is the a binary AND operator, and K is a split factor where each of the N original is further split into $2^K$ merge ranges.

A method performed by a first computing device is also described herein. The method comprises receiving a first request from a second computing device, the first request including an operation identifier (ID) associated with an operation of application and a sampling ID generated by transforming a telemetry scope ID from a first value in a first domain to a second value in a second domain; extracting the operation ID and the sampling ID from the first request; determining whether or not to sample by at least comparing a ratio between the sampling ID and a size of the second domain with a sampling rate associated with the first computing device; and recording telemetry about processing of the first request by the first computing device in response to determining to sample; and not recording any telemetry about the processing of the first request by the first computing device in response to determining not to sample.

In another embodiment of the foregoing method, the telemetry scope ID comprises one of: a user ID; a device ID; a session ID; or an account ID.

In yet another embodiment of the foregoing method, the second domain is compressed with respect to the first domain.

In still another embodiment of the foregoing method, the telemetry scope ID was transformed from the first value in the first domain to the second value in the second domain by calculating:

$$S_{id} = \frac{2^N \, hash(TS_{id})}{ulong \cdot Max}$$

wherein $S_{id}$ is the sampling ID, $TS_{id}$ is the telemetry scope ID, $hash(TS_{id})$ is a function that hashes the telemetry scope ID to an unsigned long integer, ulong.Max is a maximum value of a variable of type unsigned long integer, N is a sampling exponent, and $2^N$ is the size of the second domain.

In a further another embodiment of the foregoing method, the telemetry scope ID was transformed from the first value in the first domain to the second value in the second domain comprises calculating:

$$S_{id} = hash(TS_{id}) \bmod 2^N$$

wherein $S_{id}$ is the sampling ID, $TS_{id}$ is the telemetry scope ID, $hash(U_{id})$ is a function that hashes the telemetry scope ID to an unsigned long integer, N is a sampling exponent, and $2^N$ is the size of the second domain.

In a still further embodiment of the foregoing method, the sampling ID was generated by further performing a merging operation on the second value, the merging operation returning a merged value for each value range in a plurality of value ranges of the second value.

In another embodiment of the foregoing method, the size of each value range in the plurality of value ranges of the second value increases as the second value increases.

In yet another embodiment of the foregoing method, performing the merging operation on the second value comprises calculating:

$$\overline{S}_{id} = 2^{floor(log2 S_{id})}$$

wherein $\overline{S}_{id}$ is the sampling ID, $S_{id}$ is the second value, floor(x) is a function that takes as input a real number x and returns the greatest integer that is less than or equal to x, and $\log_2 x$ returns the binary logarithm of x.

In still another embodiment of the foregoing method, performing the merging operation on the second value comprises calculating:

$$\overline{S}_{id} = S_{id} \& (2^{floor(log2 S_{id})-K} - 1)$$

wherein $\overline{S}_{id}$ is the sampling ID, $S_{id}$ is the second value, floor(x) is a function that takes as input a real number x and returns the greatest integer that is less than or equal to x, $\log_2$ x returns a binary logarithm of x, ! is a binary NOT operator, & is the a binary AND operator, and K is a split factor where each of the N original is further split into $2^K$ merge ranges.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   a first computing device that is configured to:
      associate an operation identifier (ID) with an operation of an application;
      generate a sampling ID, generating the sampling ID comprising transforming a telemetry scope ID from a first value in a first domain to a second value in a second domain;
      determine whether or not to sample, the determining comprising at least comparing a ratio between the sampling ID and a size of the second domain with a sampling rate associated with the first computing device;
      in response to determining to sample, record telemetry about processing of the operation by the first computing device; and
      in response to determining not to sample, not record any telemetry about the processing of the operation by the first computing device.

2. The system of claim 1, wherein the telemetry scope ID comprises one of:
   a user ID;
   a device ID;
   a session ID; or
   an account ID.

3. The system of claim 1, wherein the first computing device is further configured to transmit a first request to a second computing device to perform a first service to carry out the operation, the first request including the operation ID and the sampling ID;
   the system further comprising the second computing device, the second computing device being configured to:
      receive the first request;
      extract the operation ID and the sampling ID from the first request;
      determine whether or not to sample, the determining comprising at least comparing a ratio between the sampling ID and a size of the second domain with a sampling rate associated with the second computing device;
      in response to determining to sample, record telemetry about processing of the first request by the second computing device; and
      in response to determining not to sample, not record any telemetry about the processing of the first request by the second computing device.

4. The system of claim 3, wherein the second computing device is further configured to:
   transmit a second request to a third computing device to perform a second service to carry out the operation, the second request including the operation ID and the sampling ID.

5. The system of claim 4, wherein the second computing device and the third computing device are internal to an organization.

6. The system of claim 4, wherein the second computing device is internal to an organization and the third computing device is external to the organization.

7. The system of claim 3, wherein the sampling rate associated with the second computing device is different than the sampling rate associated with the first computing device.

8. The system of claim 1, wherein the second domain is compressed with respect to the first domain.

9. The system of claim 1, wherein generating the sampling ID further comprises performing a merging operation on the second value, the merging operation returning a merged value for each value range in a plurality of value ranges of the second value.

10. The system of claim 9, wherein the size of each value range in the plurality of value ranges of the second value increases as the second value increases.

11. A first computing device, comprising:
one or more processor circuits; and
one or more memory devices communicatively connected to the one or more processor circuits, the one or more memory devices storing program logic for execution by the one or more processor circuits, the program logic comprising:
  a receiver that is configured to receive a first request from a second computing device, the first request including an operation identifier (ID) associated with an operation of an application and a sampling ID generated by transforming a telemetry scope ID from a first value in a first domain to a second value in a second domain;
  an extractor that is configured to extract the operation ID and the sampling ID from the first request;
  a sampling determiner that is configured to determine whether or not to sample by at least comparing a ratio between the sampling ID and a size of the second domain with a sampling rate associated with the first computing device; and
  a telemetry recorder that is configured to record telemetry about processing of the first request by the first computing device in response to the sampling determiner determining to sample, and to not record any telemetry about the processing of the first request by the first computing device in response to the sampling determiner determining not to sample.

12. The first computing device of claim 11, wherein the telemetry scope ID comprises one of:
a user ID;
a device ID;
a session ID; or
an account ID.

13. The first computing device of claim 11, wherein the second domain is compressed with respect to the first domain.

14. The first computing device of claim 11, wherein the telemetry scope ID was transformed from the first value in the first domain to the second value in the second domain by calculating:

$$S_{id} = \frac{2^N \, hash(TS_{id})}{ulong \cdot \text{Max}}$$

wherein $S_{id}$ is the sampling ID, $TS_{id}$ is the telemetry scope ID, $hash(TS_{id})$ is a function that hashes the telemetry scope ID to an unsigned long integer, ulong.Max is a maximum value of a variable of type unsigned long integer, N is a sampling exponent, and $2^N$ is the size of the second domain.

15. The first computing device of claim 11, wherein the telemetry scope ID was transformed from the first value in the first domain to the second value in the second domain by calculating:

$$S_{id} = hash(TS_{id}) \bmod 2^N$$

wherein $S_{id}$ is the sampling ID, $TS_{id}$ is the telemetry scope ID, $hash(U_{id})$ is a function that hashes the telemetry scope ID to an unsigned long integer, N is a sampling exponent, and $2^N$ is the size of the second domain.

16. The first computing device of claim 11, wherein the sampling ID was generated by further performing a merging operation on the second value, the merging operation returning a merged value for each value range in a plurality of value ranges of the second value.

17. The first computing device of claim 16, wherein the size of each value range in the plurality of value ranges of the second value increases as the second value increases.

18. The first computing device of claim 17, wherein performing the merging operation on the second value comprises calculating:

$$\overline{S}_{id} = 2^{floor(\log_2 S_{id})}$$

wherein $\overline{S}_{id}$ is the sampling ID, $S_{id}$ is the second value, floor (x) is a function that takes as input a real number x and returns the greatest integer that is less than or equal to x, and $\log_2 x$ returns a binary logarithm of x.

19. The first computing device of claim 17, wherein performing the merging operation on the second value comprises calculating:

$$\overline{S}_{id} = S_{id} \,\&\, !(2^{floor(\log_2 S_{id})-K} - 1)$$

wherein $\overline{S}_{id}$ is the sampling ID, $S_{id}$ is the second value, floor (x) is a function that takes as input a real number x and returns the greatest integer that is less than or equal to x, $\log_2 x$ returns a binary logarithm of x, ! is a binary NOT operator, & is a binary AND operator, and K is a split factor.

20. A method performed by a first computing device, comprising:
receiving a first request from a second computing device, the first request including an operation identifier (ID) associated with an operation of application and a sampling ID generated by transforming a telemetry scope ID from a first value in a first domain to a second value in a second domain;
extracting the operation ID and the sampling ID from the first request;
determining whether or not to sample by at least comparing a ratio between the sampling ID and a size of the second domain with a sampling rate associated with the first computing device; and
recording telemetry about processing of the first request by the first computing device in response to determining to sample; and
not recording any telemetry about the processing of the first request by the first computing device in response to determining not to sample.

* * * * *